US006047950A

United States Patent [19]

Pontoppidan et al.

[11] Patent Number: 6,047,950

[45] Date of Patent: Apr. 11, 2000

[54] THROTTLE VALVE BODY WITH A TAPERED CHANNEL ON ONE SIDE OF ITS AXIS AND A TAPERED FLAP ON THE OPPOSITE SIDE THEREOF

[75] Inventors: Michaël Pontoppidan, Rueil-Malmaison; Pierre Semence, Verneuil sur Seine, both of France

[73] Assignee: Magneti Marelli France, Nanterre, France

[21] Appl. No.: 09/068,564

[22] PCT Filed: Nov. 19, 1996

[86] PCT No.: PCT/FR96/01822

§ 371 Date: Nov. 13, 1998

§ 102(e) Date: Nov. 13, 1998

[87] PCT Pub. No.: WO97/19264

PCT Pub. Date: May 29, 1997

[30] Foreign Application Priority Data

Nov. 22, 1995 [FR] France .................................. 95 13885

[51] Int. Cl.[7] ........................................................ F16K 1/22

[52] U.S. Cl. ........................................... 251/305; 123/337

[58] Field of Search ............................. 251/305; 123/337

[56] References Cited

U.S. PATENT DOCUMENTS

| | | | |
|---|---|---|---|
| 5,315,975 | 5/1994 | Hattori et al. | 123/337 |
| 5,374,031 | 12/1994 | Semence et al. . | |
| 5,749,336 | 5/1998 | Tanaki et al. | 123/337 |

FOREIGN PATENT DOCUMENTS

| | | |
|---|---|---|
| 0 109 792 | 5/1984 | European Pat. Off. . |
| 2 663 710 | 12/1991 | France . |
| 2 674 573 | 10/1992 | France . |
| 28 05 091 | 8/1979 | Germany . |
| 2 062 182 | 5/1981 | United Kingdom . |

*Primary Examiner*—John Fox
*Attorney, Agent, or Firm*—Henderson & Sturm

[57] ABSTRACT

A throttle valve body (1) including a flap (6) of which the side pivoting down or up on opening has a shoulder (17) on the flap surface facing upwards or downwards, respectively, defining a gradually widening cross-sectional area with the cylindrical (7) or frusto-conical (9) wall opposite the intake channel (3) through the housing (2). The side of the flap (6) which rotates up or down, respectively, on opening consists of a flat half disk of which the edge is , at first, opposite a tapered surface portion (14) with a complex shape to define a gradually widening cross-sectional area downstream from an inlet convergent (15,12) and upstream from an outlet divergent, respectively.

9 Claims, 4 Drawing Sheets

Figure 1:
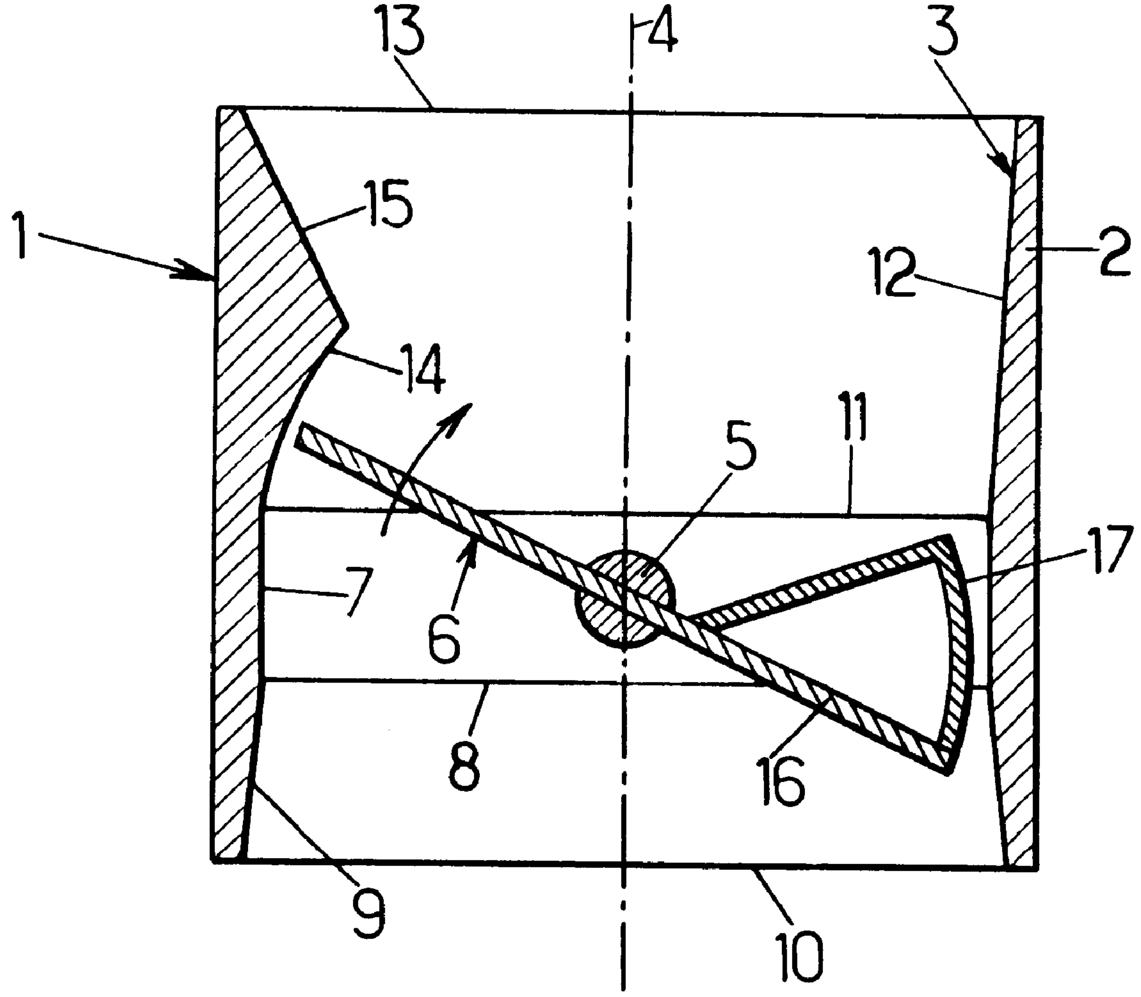

THROTTLE VALVE BODY WITH A TAPERED CHANNEL ON ONE SIDE OF ITS AXIS AND A TAPERED FLAP ON THE OPPOSITE SIDE THEREOF

The invention relates to throttle valve bodies for a fuel injection device of an internal combustion engine and has, more particularly, as its subject a throttle valve body comprising a housing, in which an air intake duct is formed, and comprising a flap in the form of a substantially circular or slightly elliptic disk, which is mounted on a center axis of rotation transverse to the duct and which is displaceable between a minimum, if appropriate zero, opening position and a maximum opening position, in which the plane of the flap is oriented substantially parallel to the axis of the intake duct, in order to regulate the airflow which is admitted into the engine and to which the fuel quantity injected for each engine cycle must be linked.

The most commonly used throttle valve bodies comprise a flap, in the form of a thin circular disk of constant thickness, and a duct in the form of a circular cylinder in the zone where the flap pivots, the passage cross section offered to the air between the flap and the wall of the duct varying rapidly from the minimum opening position of the flap during the initial angular displacement of the latter, above all when said minimum opening position is virtually zero.

Now in order to control the engine satisfactorily, that is to say so as to ensure driving comfort, under low loads (that is to say, for small openings of the flap), the initial increase in the passage cross section as a function of the position of the flap must be highly progressive.

In order to obtain the requisite progressiveness, bodies have already been provided which use a flap of complex shape (FR-A-2,674,573), which is much less advantageous than the conventional flap in the form of a simple disk, and/or a duct, the wall of which has at least one portion of complex shape (FR-2,663,710 and FR-A-2,694,963), which is costly to produce by the machining and/or casting of metal parts or which is difficult to produce by molding synthetic materials because of the need to use multiple or removable cores.

FR-A-2,674,573 describes a throttle valve body, as defined above, in which that side of the flap which rotates upstream from the minimum opening position has, on its downstream face, a bulge of a cross section (in a plane orthogonal to the axis of rotation) sufficiently small to allow the flap to rotate. That side of the flap which rotates downstream during opening and the duct cross section downstream of the minimum opening position of said side rotating downstream have, in general terms, shapes which cooperate in order to impart to the cross section for the passage of air between them a law of variation as a function of the angle of rotation, the initial gradient of which is lower than the maximum gradient of the law of variation during opening. This is obtained by causing to rotate, in an intake duct in the form of a circular cylinder in the zone of rotation of the flap, a flap, of which the side which rotates downstream during opening carries, on its upstream face, a bulge which may be symmetrical, with respect to the axis of rotation, to that on the downstream face of the flap side rotating upstream, each bulge being a flyweight attached to the flap or a shoulder in one piece with the latter, the edge of bulge having a profile selected so as to slow the increase in the passage cross section during the initial opening of the flap.

However, it is also possible for the flap side rotating downstream to be in the form of a thin half disk and for the intake duct to have, from the minimum opening position of the flap, a portion with a circular cross section decreasing downstream, thus causing a flap of complex shape to cooperate with an intake duct having a wall of complex shape.

FR-2,663,710 describes a throttle valve body, as defined above, the intake duct of which has, both upstream and downstream of the axis of rotation, a portion, one half of which is semicircular and of constant radius and the other half of which has, at each level along the axis of the intake duct, a cross section in the form of an ellipse, the complex surface of elliptic cross section located respectively upstream and downstream of the axis of rotation being on that side of the flap which pivots respectively upstream and downstream during opening.

FR-A-2,694,963 describes a throttle valve body, as defined above and of the type in which that side of the flap which rotates respectively upstream and downstream from the minimum opening position is in the form of a flat half disk and the intake duct has a wall which, on that side of the flap which is in the form of a flat half disk and respectively upstream and downstream of the minimum opening position of the flap, has an evolutive surface portion of complex shape cooperating with this flap side in the form of a flat half disk, in such a way that, at the start of the opening of the flap, the passage cross section delimited between them increases as a function of the opening angle less rapidly than in the case of a cylindrical duct.

According to FR-A-2,694,963, this is obtained due to the fact that the intake duct has a straight cylindrical portion having a cross section corresponding to the shape of the flap in the minimum opening position, said portion extending upstream and downstream of this minimum opening position, and has, upstream and downstream of the cylindrical portion and along the path followed by the upstream and downstream edges of the flap as far as a definite opening angle of the latter, respective zones which are delimited by circle arcs centered on the axis of the intake duct and having radii decreasing from the cylindrical portion and which thus form two evolutive surface portions of complex shape which may be symmetrical to one another with respect to the axis of rotation and which each cooperate respectively with one of the two flap halves in the form of a flat half disk.

The disadvantages of the throttle valve bodies of the prior art presented above are their production cost when they are made of metal, the complexity involved in the production of their mold and the difficulties encountered during removal from the mold, when these throttle valve bodies are molded from a synthetic material, for example a thermoplastic. In particular, molding throttle valve bodies according to FR-2,663,710 and FR-A-2,694,963 from synthetic material makes it necessary, on account of the complex shapes of wall portions of the intake duct, to use complex cores comprising a plurality of parts so that they can be released from the molded shapes, but without the possibility of avoiding the formation of plastic burrs at the parting planes of the part [sic] of the core. It is therefore impossible to mold such throttle valve bodies to their directly usable shape without finishing machining or deburring.

The object of the present invention is to provide a throttle valve body which meets practical requirements better than those previously known, particularly in that it makes it possible to obtain the requisite opening progressiveness, while being capable of being produced by molding from synthetic material, without having the abovementioned disadvantages, that is to say while being capable of being obtained directly in the ultimate usable shape, without any particular difficulty in removal from the mold or any particular complexity in the production of the mold.

To achieve this object, the invention provides a throttle valve body of the type defined above and known from FR-A-2,694,963, and which is characterized in that said evolutive surface portion of complex shape, which cooperates with the flap side in the form of a flat half disk which rotates respectively upstream and downstream during opening, has, at each level along the axis of the intake duct and over half the cross section of the duct on the same side of the axis of the duct as the flap side in the form of a flat half disk, a cross section substantially in the form of a half ellipse, of which the minor semiaxis, perpendicularly to the axis of rotation, decreases progressively as far as a definite opening angle of the flap, whilst, respectively upstream and downstream of this evolutive surface portion and over the same half of the cross section of the duct, as well as over the other half of the cross section of the duct, on the flap side which rotates respectively downstream and upstream during opening and as far as the level, along the axis of the intake duct, which corresponds respectively to the downstream and upstream edge of said evolutive surface portion, the wall of the duct is respectively convergent and divergent, that flap side which rotates respectively downstream and upstream during opening having respectively on its upstream and downstream face a shoulder, the edge of which has a profile selected so as to slow the increase in the passage cross section during the initial opening of the flap, with respect to a flap side in the form of a flat half disk rotating respectively downstream and upstream in a cylindrical duct, the intake duct having, respectively downstream and upstream of the minimum opening position of the flap, a portion respectively downstream and divergent to the outlet of the duct and upstream and convergent from the inlet of the duct.

By combining an evolutive shape of the intake duct, said shape being limited to a part located respectively upstream or downstream of the axis of rotation of the flap and on that side of the flap which rotates respectively upstream or downstream during opening, with a flap, of which the side rotating respectively downstream or upstream has a shoulder, it is possible to preserve the advantages of the embodiments with progressive opening of the prior art, whilst at the same time having an intake duct, of which the portion respectively downstream or upstream of the minimum opening position of the flap is respectively divergent to the outlet of the duct or convergent from the inlet of the latter, thus making the housing of the throttle valve body easy to remove from the mold, particularly when this respectively divergent or convergent portion has a circular cross section of a diameter varying monotonically from upstream in a downstream direction.

Advantageously, in the minimum opening position of the flap, the latter is arranged in a straight cylindrical central portion of circular cross section of the intake duct, said central portion being substantially symmetrical along the axis of the intake duct on either side of the axis of rotation, so that the flap, preferably of slightly elliptic shape, can be laid with its edge against the wall of the duct in this cylindrical central portion in the case of an inclination of the flap relative to a plane transverse to the axis of the duct which is approximately 5° and without the risk of the flap being jammed.

To make it easier to remove the housing from the mold, the respectively divergent downstream or convergent upstream portions of the intake duct are advantageously frustoconical from the respectively downstream and upstream edge of said cylindrical central portion respectively as far as the outlet and inlet of the intake duct, the half angle at the vortex of the frustoconical shape being capable of being selected so as to correspond to a favorable mold release angle. The clearance produced in this way in the duct makes it easier to mount a flap which is thickened locally, for example at the center, for the passage or incorporation of an axis of rotation, or on an edge.

For the same reason, and to make it possible to introduce and install the flap in the intake duct, parallel to the plane defined by the axis of the duct and the axis of rotation, on automatic assembly lines, the respectively convergent and divergent portion of that half of the wall of the intake duct which is respectively upstream and downstream of the minimum opening position of the flap and on the same side of the axis of rotation as the flap side which rotates respectively downstream and upstream during opening is advantageously a frustoconical surface portion convergent respectively from the inlet and the outlet of the duct respectively as far as the upstream and downstream edge of the cylindrical central portion, so that the diameter of the intake duct in the above-defined plane in which the flap is introduced always remains greater than the diameter of the flap.

In a simple embodiment, the shoulder on one face of the flap advantageously has a shape substantially of an ellipsoidal cap which has a major axis substantially parallel to the axis of rotation, but slightly offset in the downstream direction of the latter, and the periphery of which is connected to the edge of the flap side rotating respectively downstream and upstream. The flap may thus be produced from synthetic material, for example thermoplastic, and comprise a flat disk, to which said shoulder is molded or attached, for example secured by ultrasonic welding, the shoulder being capable, for example, of being formed by a cup delimiting a closed space or of being molded together with the flap, at the same time delimiting a space open downstream in the duct.

The housing, together with its intake duct, may likewise be molded in one piece to the ultimate shape from a synthetic material, for example thermoplastic.

Figure 2:
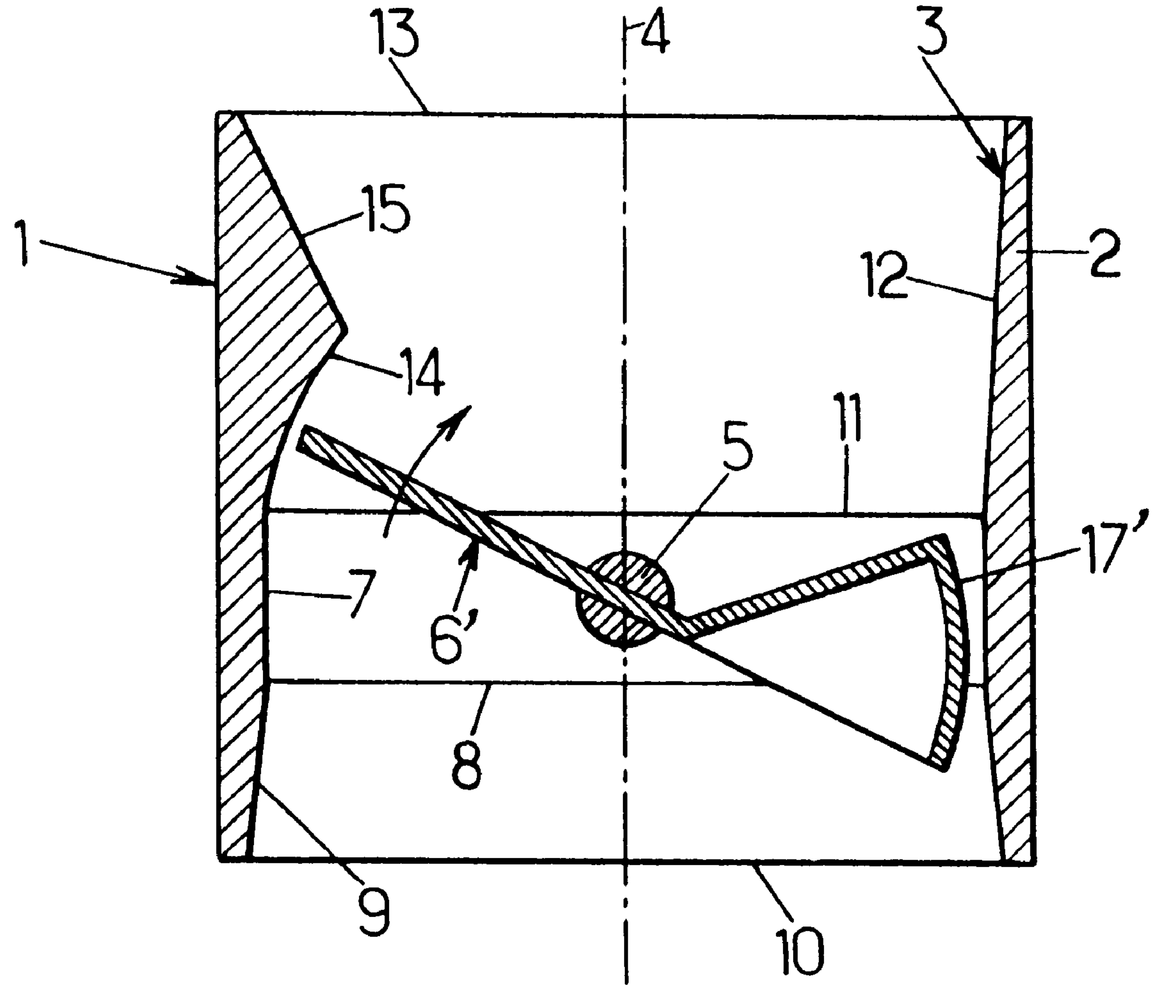
Figure 3:
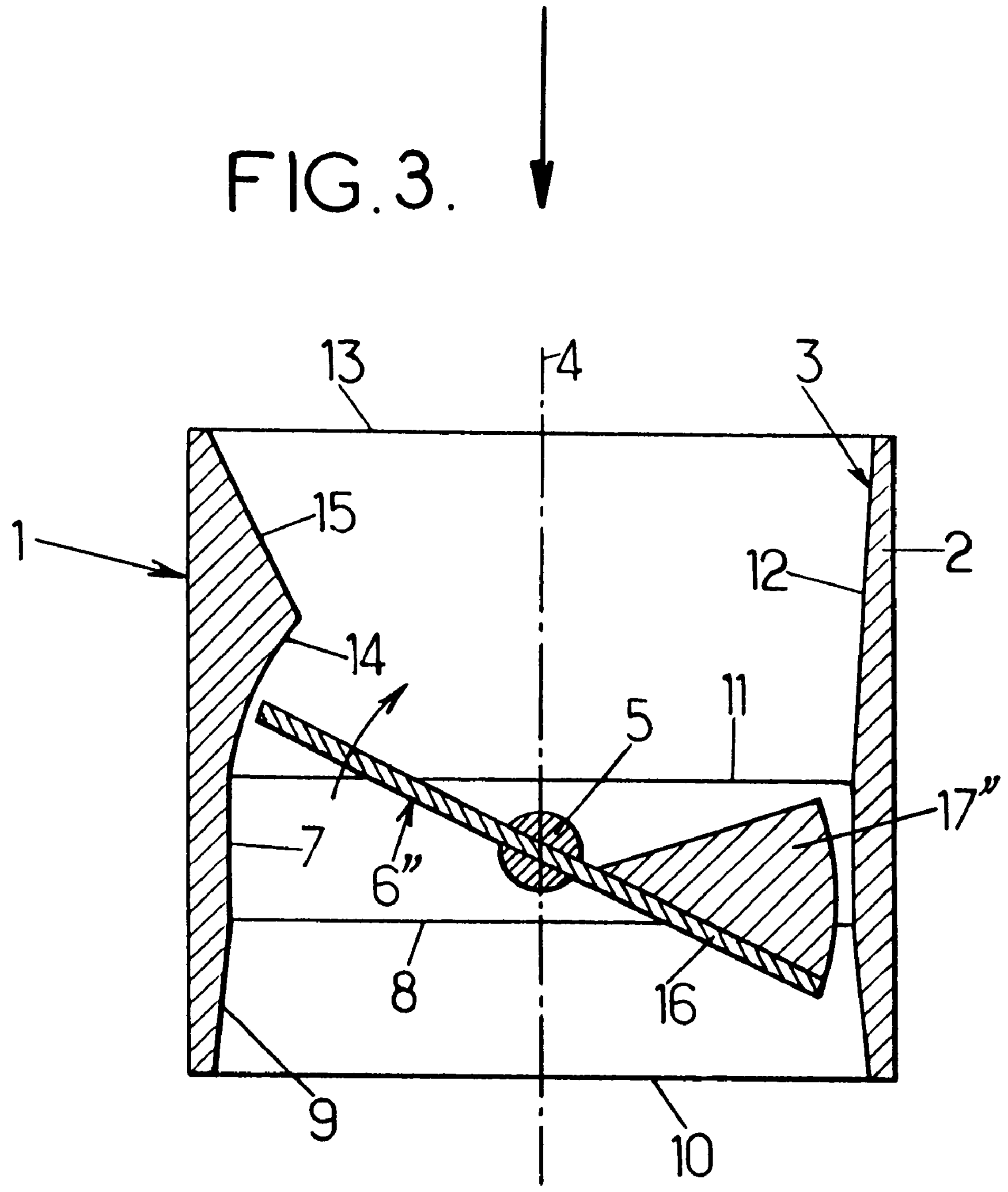
Figure 4:
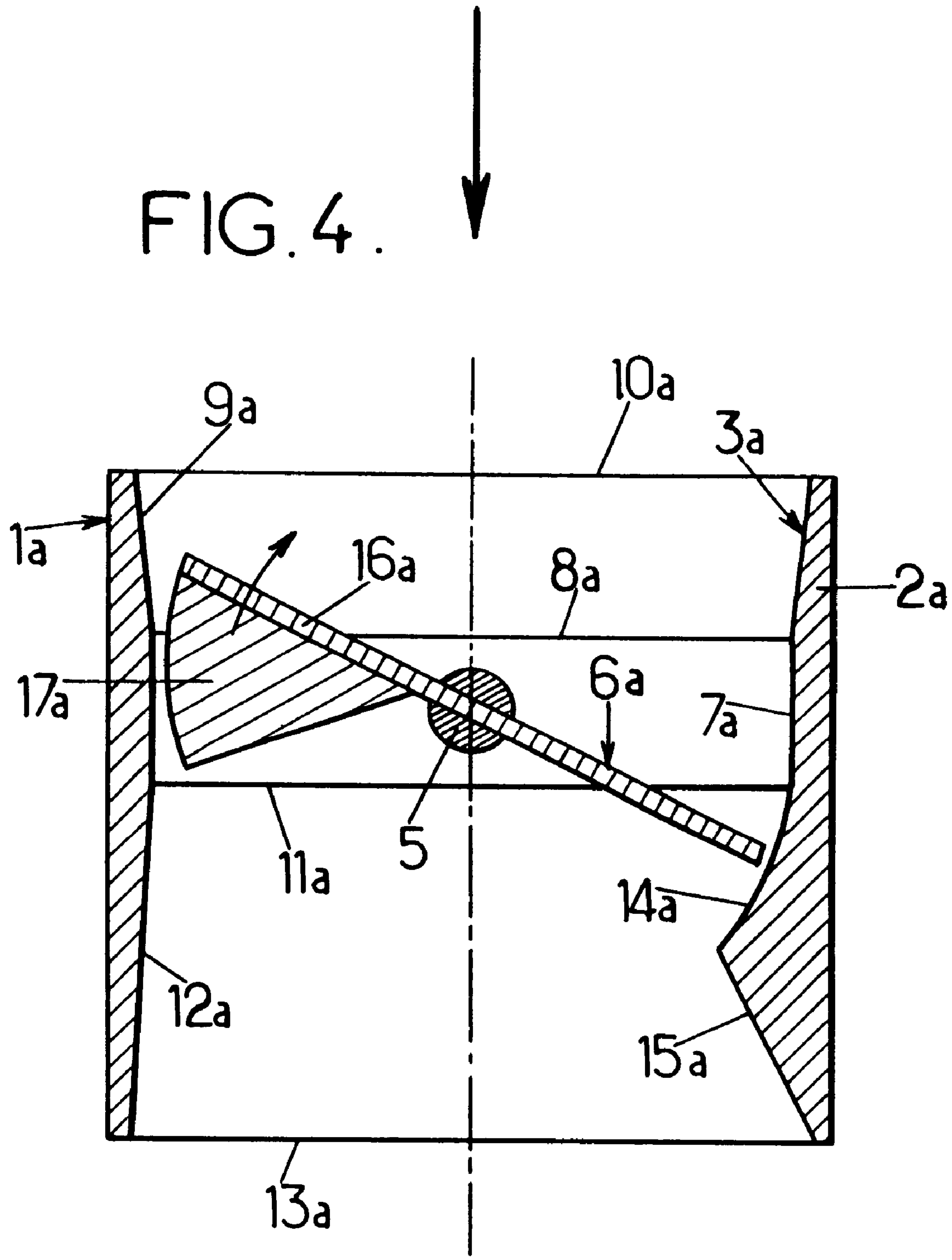

The invention will be understood better from a reading of the following description of particular embodiments given by way of nonlimiting examples with reference to the accompanying drawings, in which:

FIG. 1 is a diagrammatic view in axial section, perpendicularly to the axis of rotation, of an example with a shoulder in the form of a closed cup on the upstream face of the flap half rotating downstream to the start of opening, FIGS. 2 and 3 are views, similar to that of FIG. 1, of two variants respectively with a shoulder in the form of a cup open downstream and with a solid shoulder, and FIG. 4 is a view, similar to that of FIG. 3, of a variant symmetrical with respect to the axis of rotation, the airflow always coming from the top of the figure.

In FIG. 1, the throttle valve body 1 comprises a housing 2 produced by molding from a synthetic material, such as a thermoplastic, and obtained in its ultimate shape without any additional machining or deburring. An intake duct 3 of longitudinal axis 4 is formed in the housing 2.

A shaft 5 perpendicular to the longitudinal axis 4 of the duct 3 and intersecting this axis 4 is mounted pivotably in the housing 2 and forms the center axis of rotation transverse to the duct 3 for a flap 6.

The rotary shaft 5 is mounted pivotably in a central portion 7 of the duct 3. In this central portion 7, the wall of the duct 3 is a straight cylindrical wall of circular cross section, which extends substantially symmetrically on either side of the rotary shaft 5 along the longitudinal axis 4 of the duct 3. Downstream of the downstream edge 8 of the central portion 7, the duct 3 has a divergent downstream portion 9 which is frustoconical from the downstream edge 8 as far as the outlet 10 of the duct 3, at the bottom in FIG. 1. In this divergent downstream portion 9, the cross section of the duct 3 is therefore circular with a radius progressively increasing monotonically from upstream in a downstream direction.

Upstream of the upstream edge 11 of the central portion 7, the wall of the duct 3 is dissymmetric with respect to the diametrical plane passing through the axis 4 of the duct 3 and the center of the rotary shaft 5. Over half of the cross section of the duct 3, said half being located on the right of the rotary shaft 5 in FIG. 1, the wall of the duct 3 is defined by a frustoconical surface portion 12 which is coaxial to the axis 4, in the same way as the downstream divergent 9, but which converges from the inlet 13 of the duct 3, in the top part of FIG. 1, as far as the upstream edge 11 of the cylindrical central portion 7.

In the other half of the cross section of the duct 3, on the left of the axis 4 and of the rotary shaft 5 in FIG. 1, the wall of the duct 3 is delimited by an evolutive surface portion 14 of complex shape, which extends upstream of the upstream edge 11 of the central portion 7 as far as a position opposite the edge of the flap 6 when the latter in inclined at a particular angle of between approximately 30° and approximately 50° to the transverse plane perpendicular to the axis 4 of the duct 3 and passing through the center of the rotary shaft 5, and, upstream of this evolutive surface portion 14, the wall of the duct 3 is delimited by a convergent surface portion 15 which converges from the inlet 13 of the duct 3.

In the evolutive surface portion 14, the corresponding cross sectional half of the duct 3 has a substantially semielliptic shape which evolves progressively from a semicircular shape at the upstream edge 11 of the central portion 7 as far as a semielliptic half cross section of smaller minor semiaxis at the connection between the evolutive surface portion 14 and the convergent surface portion 15. In other words, at each level along the axis 4 of the duct 3 upstream from the upstream edge 11 of the central portion 7 and as far as the level at which the evolutive surface portion 14 is connected to the convergent surface portion 15, the corresponding half cross section of the duct 3 has the shape of a half ellipse, of which the minor semiaxis, perpendicularly to the rotary shaft 5, decreases progressively, whilst its major axis remains constant and equal to the diameter of the cylindrical central portion 7.

The flap 6, advantageously made from a synthetic material, such as a thermoplastic, consists of a substantially circular or slightly elliptic disk 16 having a generally constant thickness, but being capable of comprising reinforcing ribs, passing through a diametrical slot of the rotary shaft 5, and that side of the flap 6 which rotates downstream during the opening of the flap, that is to say, bearing in mind the direction of rotation of the flap during opening which is indicated by an arrow in FIG. 1, the flap half on the right of the shaft 5 in this FIG. 1, is a flat half disk having, on its upstream face, a shoulder 17 molded preferably from the same synthetic material as the flat disk 16 and attached and secured, for example by ultrasonic welding, to the half disk, which rotates downstream during the opening of the flap 6, so as to delimit a closed space. This shoulder 17 consists of a cup which projects in the upstream direction of the duct 3 and the downstream periphery of which is connected to the downstream edge of the half disk of the flap 6, said half disk rotating downstream during opening. That wall of the cup 17 which is opposite the wall of the duct 3 has substantially the shape of an ellipsoidal cap, the major axis of which is parallel to the rotary shaft 5, is offset by a short distance downstream of this shaft 5 and is slightly smaller than the diameter of the central portion 7 and the minor axis of which is selected so as to give this wall of the shoulder 17 a profile which, together with the opposite profile of the wall of the duct 3, delimits a passage cross section for the air admitted to the engine, said passage cross section increasing less rapidly, as compared with a flap in the form of a flat disk rotating in a cylindrical duct, when the flap 6 opens from its minimum opening position, in which the flat disk 16 and the essential part of the shoulder 17 are accommodated in the cylindrical central portion 7, into a position such that the flat disk 16 is inclined a few degrees to the transverse plane perpendicular to the axis 4 and passing through the center of the rotary shaft 5. Thus, the half disk carrying the shoulder 17 and rotating downstream during opening is slightly inclined downstream, whilst, on the opposite side of the shaft 5, the flat half disk, without a shoulder, rotating upstream during the opening of the flap 6, is slightly inclined upstream. The profile of the edge of the shoulder 17 is selected so as to allow the half disk carrying the shoulder to rotate downstream, without the shoulder 17 being in contact with the wall of the duct 3.

In the axial section of FIG. 1, the flap 6 is illustrated in an intermediate position between its minimum opening position and its maximum opening position, in which the flat disk 16 of the flap 6 is oriented substantially parallel to the axis 4 of the duct 3. In this intermediate position, in which the opening angle of the flap 6 is smaller than the given maximum angle of inclination for defining the evolutive surface 14, that side of the flap 6 which is in the form of a flat half disk and which rotates upstream during the opening of the flap cooperates via its upstream edge with this evolutive surface 14 so as to define, between the latter and the upstream edge of the flap 6, a passage cross section for the air (circulating from the top downward in the figures), said passage cross section increasing as a function of the opening angle less rapidly than in the case of a flap in the form of a flat disk rotating in a cylindrical duct, as long as the flap 6 is in the initial opening phase, in which its upstream edge is displaced opposite the evolutive surface 14.

It will be understood that, by selecting the profile of the shoulder 17, on the one hand, and selecting the profile of the evolutive surface 14 opposite the upstream flat half disk of the flap 6, it is possible to obtain virtually any desired low of variation of the airflow as a function of the opening angle of the flap 6 in a throttle valve body 1, the housing 2 of which has an intake duct 3 having a shape which makes it easy to remove from the mold. In the example of FIG. 1, these advantages are afforded by the combination of a flap, of which the edge rotating downstream is shouldered, with a duct, the wall of which has an evolutive surface portion of complex shape limited to a surface part located upstream of the axis of rotation of the flap and opposite the flap edge rotating upstream.

The variant of FIG. 2 differs from the example of FIG. 1 only in the production of the shoulder which is a cup 17' molded in one piece with the flap 6' so as to delimit, in the half flap pivoting downstream during opening, a space which is open downstream in the duct 3 and which has the same shape as in FIG. 1, so that identical references are used to denote parts of identical shape.

Likewise, the variant of FIG. 3 differs from FIGS. 1 and 2 only in the production of the shoulder 17" which is solid and molded and attached to the upstream face of the half disk 16 pivoting downstream during opening or, if appropriate, is molded in one piece with this disk half 16 to form the flap 6". The housing 2 and its duct 3 are otherwise identical.

Finally, the variant of FIG. 4 is symmetrical to that of FIG. 3 with respect to the rotary shaft 5, but the airflow always circulates from the top downward in the figure. Consequently, the shoulder 17*a* is on the downstream face of that half of the disk 16*a* of the flap 6*a* which pivots upstream during opening, whilst the other half of the disk 16*a,* which other half pivots downstream during opening, is displaced opposite the evolutive surface 14*a,* downstream of the downstream edge 11*a* of the straight and circular cylindrical central portion 7*a* of the duct 3*a*. Downstream of the downstream edge 11*a* and of the evolutive surface 14*a,* the duct 3*a* has respectively a frustoconical divergent 12*a* and a divergent 15*a* on the corresponding halves of the cross section which extend as far the outlet 13*a* of the duct 3*a*. Upstream of the upstream edge 8*a* of the central portion 7*a,* the duct 3*a* has a frustoconical convergent 9*a* from its inlet 10*a* in the housing 2*a* of the throttle valve body 1*a*.

This variant has the same advantages as the preceding ones as regards the ease with which molding is carried out and progressiveness in the variation of the airflow. However, it may prove slightly unfavorable in terms of turbulence under some conditions of use.

We claim:

1. A throttle valve body for a fuel injection device of an internal combustion engine, said body comprising:

a housing in which an air intake duct is formed and a flap having the form of a substantially circular disk said flap being mounted on a central rotation shaft extending transversely with regard to said duct, said flap being displaceable by pivoting with said rotation shaft on an opening angle between a minimum opening position and a maximum opening position in which said flap is oriented substantially parallel to an axis of said duct, said flap having a first side part which rotates upstream from said minimum opening position, said first side-part being substantially in the form of a flat half disk and said intake duct having a wall which, on the same side as said flap first side-part and upstream of said minimum opening position of said flat, has an evolutive surface portion cooperating with said flap first side part, such that, at the start of an opening displacement of said flap, a passage delimited between said flap and said evolutive surface portion has a cross section increasing as a function of said opening angle less rapidly than in the case of a cylindrical air intake duct, wherein said evolutive surface portion has, at each level along said duct axis and over a first duct cross section half which extends on the same side of said duct axis as said flap first side part, a cross section substantially in the form of a half ellipse, having a minor semiaxis, perpendicularly to said rotation shaft, which decreases progressively as for as definite opening angle of said flap, while upstream of said evolutive surface portion and over said first duct cross section half, as well as over a second duct cross section half on the same side as a second side part of said flap which rotates downstream during opening and as far as a level position, along said duct axis, which corresponds to a downstream edge of said evolutive surface portion, said duct has a wall which is convergent, said flap second side part having an upstream face on which there protrudes a shoulder with an edge having a profile selected so as to slow the increase of said passage cross section during the initial flap opening, with respect to a flap second side part in the form of a flat half disk rotating downstream in a cylindrical duct, said intake having, downstream of said minimum opening position of said flap, a downstream and divergent portion as far as an outlet of said duct.

2. The throttle valve body according to claim 1, wherein in said minimum opening position of said flap, said flap is arranged in a straight cylindrical central portion of circular cross section of said intake duct, said central portion being substantially symmetrical along said duct axis on either side of said rotation shaft.

3. The throttle valve body according to claim 2, wherein said divergent downstream portion of said intake duct is frustoconical from a downstream edge of said cylindrical central portion as far as said outlet of said intake duct.

4. The throttle valve body according to claim 2, wherein said convergent portion of a half of the wall of said intake duct which is upstream of said minimum opening position of said flap and on the same side of the rotation shaft as said flap second side part during opening is a frustoconical surface portion convergent from an inlet of said duct as far as an upstream edge of said cylindrical central portion.

5. The throttle valve body according to claim 1, wherein said housing, together with said intake duct, is molded in one piece to the ultimate shape from a synthetic material.

6. The throttle valve body according to claim 1, wherein said shoulder protruding on said upstream face of said flap has a shape substantially of an ellipsoidal cap which has a major axis substantially parallel to said rotation shaft and slightly offset in the downstream direction of said shaft, and wherein said shoulder has a periphery which is connected to an edge of said flap second side part.

7. The throttle valve body according to claim 6, wherein said flap is made of synthetic material and comprises a flat disk integrally made with said shoulder.

8. The throttle valve body according to claim 7, wherein said shoulder is formed by a cup delimiting a closed space.

9. The throttle valve body according to claim 7, wherein said shoulder is formed by a cup molded together with said flap and delimiting a space open downstream in the duct.

* * * * *